Oct. 27, 1959        A. SAUNDERS        2,910,127
SOIL AERATING IMPLEMENT
Filed Aug. 18, 1958        2 Sheets-Sheet 1
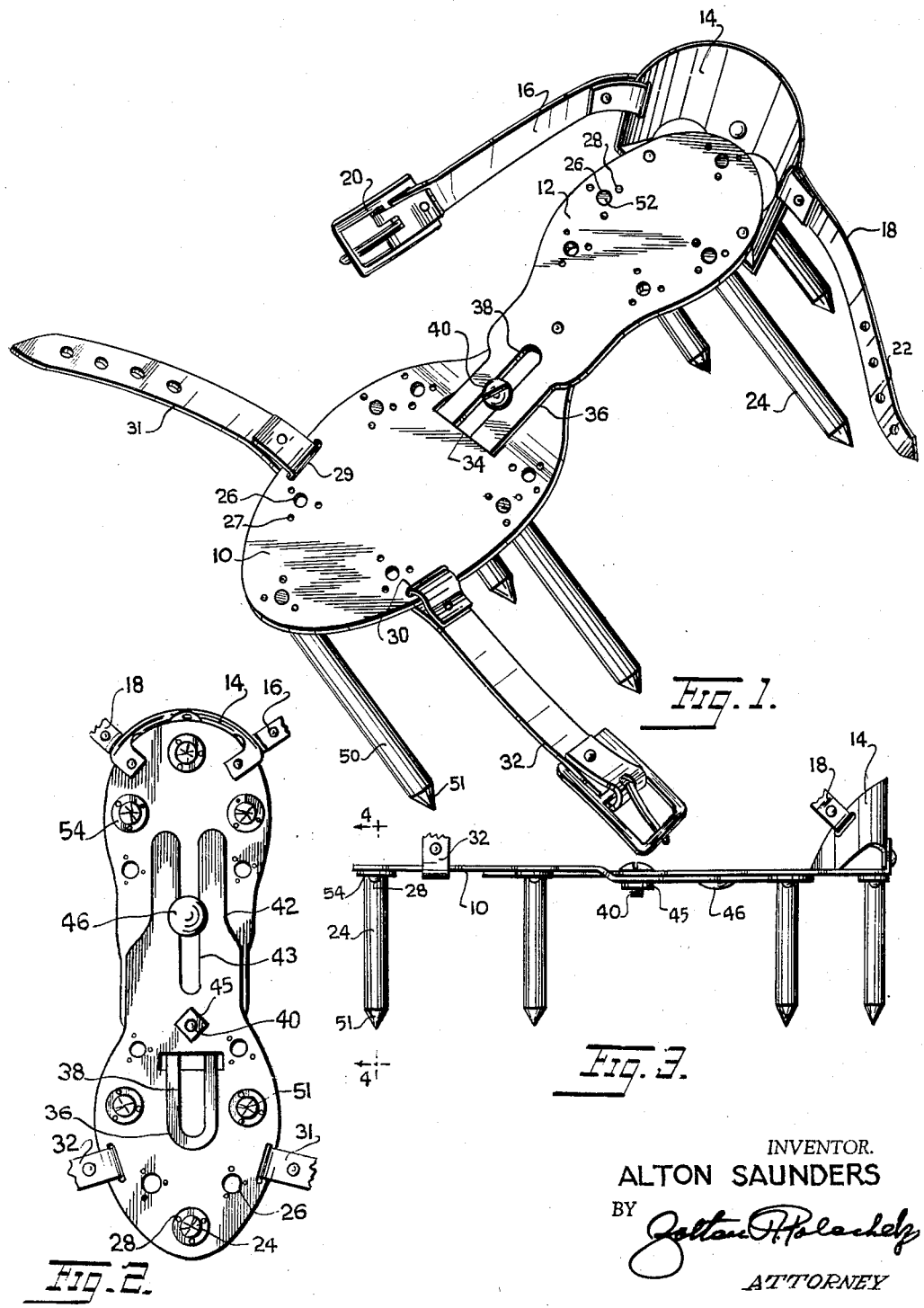
INVENTOR.
ALTON SAUNDERS
BY
ATTORNEY Oct. 27, 1959 — A. SAUNDERS — 2,910,127
SOIL AERATING IMPLEMENT
Filed Aug. 18, 1958 — 2 Sheets-Sheet 2

INVENTOR.
ALTON SAUNDERS
BY
ATTORNEY

United States Patent Office 2,910,127
Patented Oct. 27, 1959

2,910,127
SOIL AERATING IMPLEMENT
Alton Saunders, Lakewood, N.J.

Application August 18, 1958, Serial No. 755,509

2 Claims. (Cl. 172—21)

This invention relates to the art of lawn and garden dressing implements and particularly concerns a tool of the type used in forming holes in lawns and gardens so fertilizer and water will enter the ground adjacent the roots of grass and other plants.

A principal object is to provide a multi-tined lawn or garden tool which can be used to perforate the soil to aerate it, to break up clods, tamp the soil and increase moisture absorption capability.

A further object is to provide a multi-tined tool adapted to be worn upon the foot of a gardener who uses the tool by foot pressure upon the ground.

In walking about a prescribed area of a lawn or garden, with one of the tools attached to each foot, the gardener presses the tines of the tools repeatedly into the ground to form the desired holes. At the same time the weight of the gardener upon the bodies of the tools serves to tamp the ground around the holes formed by the tines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a tool embodying the invention.

Fig. 2 is a bottom plan view of the tool.

Fig. 3 is a side elevational view of the tool.

Figure 4:
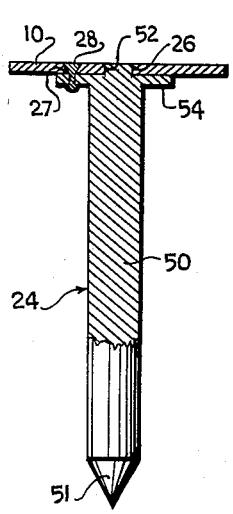
Fig. 4 is a sectional view taken on lines 4—4 of Fig. 3, showing one form of tine construction.

In Figs. 1–3 there is shown an implement in the form of a foot plate having two plate sections 10 and 12. Heel plate section 12 has a curved back plate 14 riveted to it. Back plate 14 is slotted at opposite ends and strap members 16 and 18 are secured in the slots. The straps are provided with a buckle 20 and holes 22 for mutual engagement about the ankle of a wearer's foot. Secured at spaced positions around the plate section 12 are long tines 24 each secured in an aperture 26 in the plate by rivets 28. Similar tines are secured in spaced positions on the toe plate section 10. This section is slotted at 29 and 30 to retain the looped strap sections 31 and 32 therein. These strap sections are adapted to be mutually engaged over the instep of the wearer's foot. Plate section 10 is slotted and bent at 34 so that tongue 36 of the heel plate section 12 can be inserted therein. The tongue is slotted at 38. A bolt 40 passes through slot 38 and a hole in plate 10. This bolt can be secured by a nut 45 on the underside of the plate section 10. A tongue 42 is provided at the inner end of plate section 10. This tongue is slotted at 43 so that the sides of the tongue can slide past the overhanging head of a rivet 46 secured in the top plate section.

The arrangement of the several foot plate sections is such that the implement can be extended or retracted in size and fixed to fit the underside of a wearer's shoe. Additional holes 26 are provided in the toe and heel plate sections for insertion and attachment of additional tines 24 if desired.

The structure of tine 24 is best shown in Fig. 4. It has a long, round generally cylindrical metal body 50 terminating in a rather sharp point 51. The length of the tine should be at least two inches to insure reasonably deep penetration of the soil. The tine may be somewhat longer if desired. About six inches is considered the maximum practical length for a tine applied by an implement worn upon the foot of the user. The tine has a smooth body so that the soil adheres thereto to a minimum degree. The top of the body 50 terminates in a plug or stud 52 adapted to enter in one of the holes 26 in one of the foot plate sections. A flange 54 is formed near the top of body 50 just below stud 52. This flange is provided with apertures through which may be inserted the rivets 28 which secure the tine to the plate section 10 or 12. The rivets extend through holes 27 in the plates 10, 12.

Figure 5:
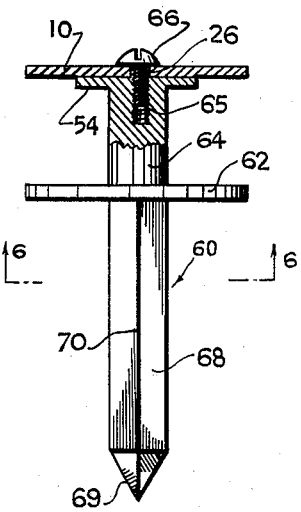
Fig. 5 is a view similar to Fig. 4 of another form of tine construction.
Figure 6:
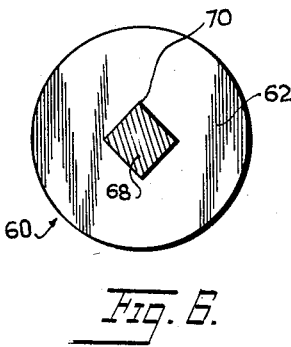
Fig. 6 is a sectional view taken on lines 6—6 of Fig. 5.

Tine 60 shown in Figs. 5 and 6 has another wide flange 62 spaced from the flange 54 by a cylindrical body section 64. The body section 64 has a threaded bore 65 in its upper end in which a screw 66 may be threaded. The tine has a body 68 which is generally rectangular in cross section and terminates in a pyramidal-shaped point 69. This tine structure is preferred where it is necessary to work in hard ground. The rather sharp edges 70 serve to cut through the ground very effectively. The flange 62 serves to limit the depth of penetration of the tine into the ground. In addition, it prevents the underside of the foot plate from being soiled as the user walks around the lawn or garden wearing the implement on his foot. The flange 62 also serves to tamp the loosened ground around the hole made by the body of the tine so that when the wearer raises his foot, the tamped area around the hole remains intact and a clean, sharply defined hole remains.

Figure 7:
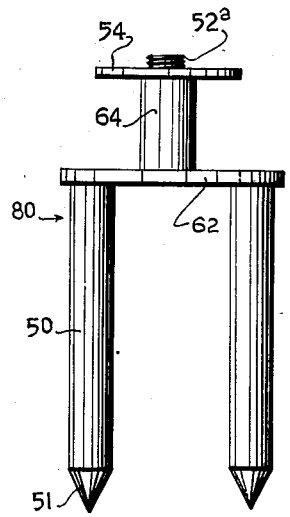
Fig. 7 is an elevational view of still another form of tine construction.
Figure 8:
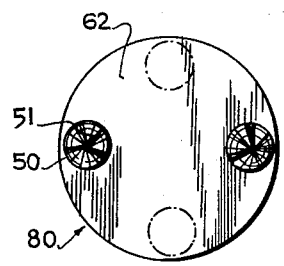
Fig. 8 is a bottom plan view of the structure of Fig. 7.

The tine 80 shown in Figs. 7 and 8 has two cylindrical tine bodies 50 integrally formed thereon. The upper end of body portion 64 is formed with a threaded stud 52a which is adapted to be screwed into an aperture 26 or which may be secured by a nut (not shown) to one of the plate sections 10, 12. If desired, more than two tine bodies may be formed on flange 62 as indicated by dotted circular lines in Fig. 8. Each of tines 24, 60, and 80 is formed as a single integral structure.

Figure 9:
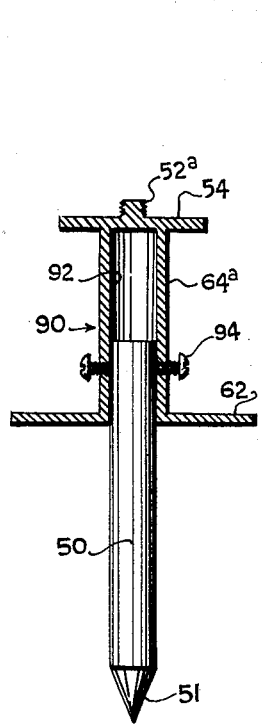
Fig. 9 is an elevational view partially in section of a further form of tine structure.

The tine 90 shown in Fig. 9 has a hollow body section 64a formed with a cylindrical bore 92 adapted to receive the cylindrical body 50 of the tine. The tine body is telescopically adjustable in the body section 64a and is securable at a selected position by setscrews 94 inserted through the wall of the body section.

The prongs or tines 24 and 50 may also be force-fitted or brazed into the plates 10 and 12.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A lawn or garden implement, comprising a footshaped plate, means for securing the plate to the underside of a wearer's shoe, and a plurality of tines secured to the underside of the plate and extending perpendicularly thereto, each of said tines having a length of at least two inches to aerate the ground of the lawn effectively, each of said tines having a generally cylindrical body with a sharp point at the outer free end thereof and a cylindrical body section with a bore therein, said body being telescopically adjustable in said body section, said body section having a flange at each end thereof, one of the flanges being adapted to abut said plate and the other flange being adapted to tamp the ground around the hole formed by the tine.

2. A tine for a lawn or garden implement comprising a generally cylindrical body, flanges integrally formed with said body on opposite ends thereof, said body having a cylindrical bore therein, and a cylindrical member telescopically adjustable in said bore, setscrews threaded in said body and adapted to secure said member in a selected position in said bore, said member having a pointed free end.

References Cited in the file of this patent

UNITED STATES PATENTS

| | | |
|---|---|---|
| 325,839 | Hogelboom | Sept. 8, 1885 |
| 381,169 | Rhodes | Apr. 17, 1888 |
| 817,083 | Moeller | Apr. 3, 1906 |
| 1,802,711 | Fitts | Apr. 28, 1931 |
| 1,864,859 | Rodgers | June 28, 1932 |
| 2,193,779 | Ramsden et al. | Mar. 12, 1940 |
| 2,347,748 | Melling | May 2, 1944 |

FOREIGN PATENTS

| | | |
|---|---|---|
| 6,201 | Australia | Feb. 19, 1932 |
| 403,212 | Great Britain | Dec. 21, 1933 |
| 455,822 | Great Britain | Oct. 28, 1936 |
| 523,644 | Great Britain | July 18, 1940 |